Dec. 2, 1958 L. W. MILLER 2,862,285
QUICK RELEASE TOOL HOLDER
Filed Sept. 23, 1955
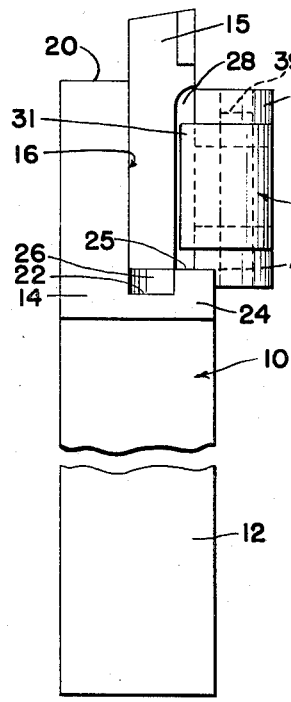
FIG. 1
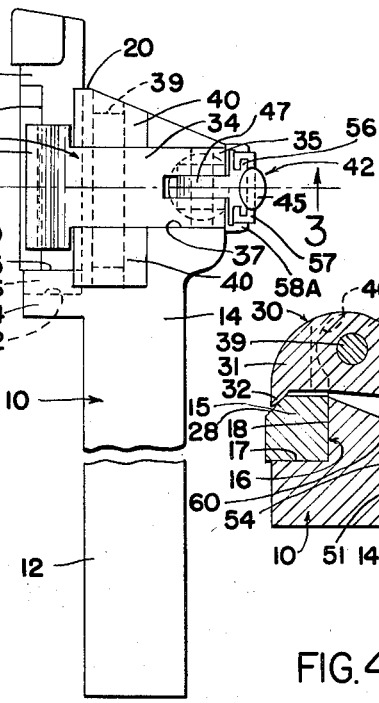
FIG. 2
FIG. 3
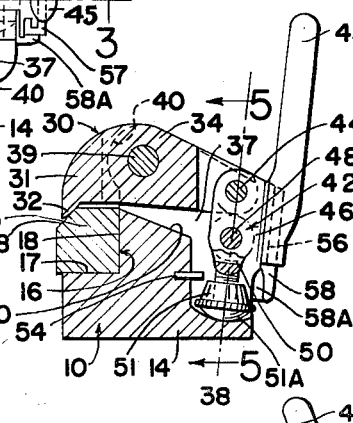
FIG. 4
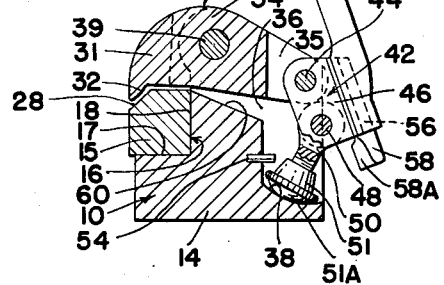
FIG. 5
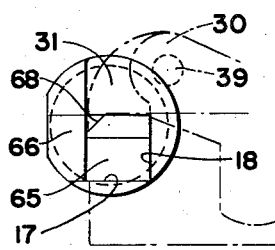
FIG. 7
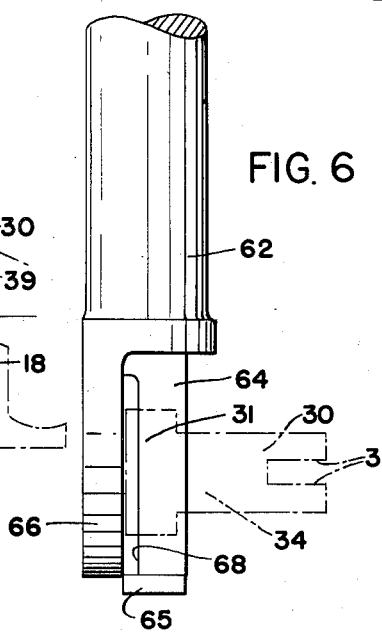
FIG. 6
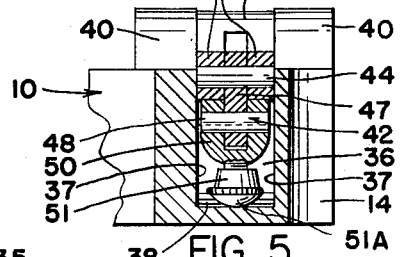
*INVENTOR.*
LLOYD W. MILLER
BY *Ely, Fryer & Hamilton*
ATTORNEYS

United States Patent Office 2,862,285
Patented Dec. 2, 1958

2,862,285

QUICK RELEASE TOOL HOLDER

Lloyd W. Miller, Tallmadge, Ohio

Application September 23, 1955, Serial No. 536,135

3 Claims. (Cl. 29—96)

The present invention relates to an improved holder for metal cutting tools and tool bits. More particularly, my invention relates to a tool holder which may be quickly released and will securely hold in accurate cutting position specially adapted tools or tool bits.

Conventional changeable type tool holders have several disadvantages. Most of them are cumbersome and require the manipulation of several screws, bolts or clamps. When a tool or tool bit has been inserted in such a device it is generally necessary for the machinist to closely check the alignment of the tool or tool bit with the tool holder and the surface of the metal being worked. Further, devices of this type do not provide for clamping tools or tool bits having different size shanks without the use of clamping sleeves.

Accordingly, it is an object of my invention to provide an improved tool holder which may be quickly released; which will accurately position and clamp a tool or tool bit; and which will permit the successive and rapid clamping of tools or tool bits having varied size shanks.

These and other objects, as well as the advantages, will be apparent in view of the following disclosure taken in conjunction with the accompanying drawing.

In the drawing:

Fig. 1 is a side elevation, showing the improved tool holder,

Fig 2 is a top view of the tool holder,

Fig. 3 is a sectional view taken substantially on line 3—3 of Fig. 2 showing the tool holder in the clamped or locked position, Fig. 4 is a view similar to Fig. 3, showing the tool holder in the open position, Fig. 5 is a fragmentary sectional view taken substantially on line 5—5 of Fig. 3, Fig. 6 is a view similar to Fig. 2, showing a specially adapted shank for a conventional tool, the clamp bar of the novel tool holder being shown in dotted lines, and Fig. 7 is a view, similar to Fig. 3 of the specially adapted tool shank, parts of the novel tool holder being shown in dotted lines.

Referring to the drawings, the tool holder is indicated generally by the numeral 10. The inner shank portion 12 is adapted to be held in a machine tool (not shown). The forward end or head 14 of the tool holder is larger in cross section than the shank 12 and provides for releasably clamping either a specially adapted carbide tipped tool bit 15, or a specially adapted shank of a tool as described hereinafter in conjunction with Figs. 6 and 7.

The tool bit 15 is inserted, positioned, and clamped within a notch or area indicated generally by the numeral 16 and opening both endwise and outwardly of the head 14. Assuming the tool holder to be in the position of Fig. 3, the insert notch preferably has an exactly horizontal bottom wall 17 connecting with a perpendicular inside wall 18. These walls extend from the front 20 of the head portion 14 to a transverse end wall 22. The end wall 22 extends vertically (a distance less than the height of tool bit 15) and terminates on the underside of a forwardly extending projection 24, the vertical front surface 25 of which functions as an end stop or positioning means when the bit 15 is inserted within the notch 16.

As shown in Fig. 1, the inner end of the tool bit 15 does not extend beyond the vertical surface 25. The area 26 beneath the projection 24 and forwardly of the end wall 22 receives the small end of the shank of a tool shown in Figs. 6 and 7; as described hereinafter.

The tool bit 15 has bottom and inside outer surfaces which are exactly parallel with the walls 17 and 18 of the insert notch 16. The upper, outer edge of the shank of the tool bit, beginning at a point approximately one third of the way in from its outer tip, is provided with a beveled surface 28 which is engaged by a clamping means 30.

As shown herein, the clamping means 30 is a T-shaped member having a cross-bar portion 31 on the underside of which is an inwardly facing beveled latch-like projection 32. The projection 32, which engages the beveled surface 28 of the tool bit, preferably has a very slight convex or outward curve in order to effectively clamp tool bits varying slightly in size. The leg or stem of the clamp member has a medial portion 34 and a bifurcated end portion 35.

The clamp 30 is movable within a lateral recess 36 extending downwardly into and crosswise of the end portion 14. The lateral recess 36 has opposed sidewalls 37 and a bottom wall 38 which provide an area in which the clamp 30 and a toggle joint clamping means may move.

Movement of the clamp 30 is on a pivot point or axis provided by pin 39 which is loosely inserted through the medial portion 34. The pin 39 is tightly fitted at either end, into a pair of bosses 40 rising from the sidewalls 37 of the lateral recess 36.

Movement of the clamp 30 is actuated by a toggle joint indicated generally by the numeral 42. The toggle joint 42 moves within the recess 36 on a pivot point or axis provided by a pin 44 tightly fitted, at either end, into the bifurcations of the clamp end 35.

The toggle joint 42 is actuated by a removable lever handle or arm 45 which is engaged with a toggle link 46. The toggle link 46 is substantially T-shaped, as shown in Fig. 2. The leg portion 47 is inserted between the bifurcations of the clamp end 35, within the recess 36, and is pivoted at its upper corner on a pin 44. At the lower, inner corner of the leg portion 47, a third pin 48 is inserted therethrough to provide a pivot point or axis for rotation of a toggle clevis 50, and a nut 51 having a rounded or hemispherical head 51A, adjustably threaded on the clevis. The head 51A rocks and slides on the curved or rounded bottom wall 38 to provide the "slide" necessary for the toggle joint 42 to function. If desired, a pin 54 may be inserted in a wall of the recess 36 so as to prevent the toggle nut 51 from being pulled out of the recess 36 accidentially when the clamp 30 is opened (see Fig. 4, and also to ensure full raising of the clamp for sidewise removal of the tool bit 15.

The outer cross-bar portion of the toggle link 46 is provided with ears 56 which slidably engage with matching flanges 57 on the lower end of the lever arm 45. If desired, the lowermost portion of the bar may be provided with an extension 58 which serves to protect the toggle link 42 and the transverse recess 36 against the entrance of metal chips. Flanges 58A, on either edge of the central portion of the extension 58, contact the side of the head 14 on either side of the recess 36 so as to prevent inward movement of the pin 48 substantially beyond the locking axis shown in Fig. 3.

Referring specifically to Figs. 3–5, use of the tool holder 10 is as follows. To remove a tool bit 15 from the holder, the toggle link 42 is moved by the lever 45 from the position of Fig. 3 to that of Fig. 4. Such actuation causes the toggle link 46 to pivot on pin 44 moving the pin 48 outwardly, the nut 51 pivoting on the rounded surface 38 of the recess 36. The effect of thus shortening the distance between the pin 44 and the nut 51 is to cause the clamp 30 to rotate on pin 39 and to release the bar 33 and lip 31 from engagement with the tool bit 15. The medial portion of the head 14 beneath pin 39 is provided with a sloping surface 60 so as to permit unhindered movement of the clamp.

To clamp a tool bit 15 in the tool holder, the lever arm 45 is moved from the position of Fig. 4 to that of Fig. 3. When such movement is complete, the lever arm is removed and the tool holder will remain clamped; the three pivot points of the toggle joint as represented by pins 44 and 48, and by the head of nut 51 in contact with the surface 38, being on a locking axis. It is desirable that the pivot point represented by pin 48 be very slightly inward of pivot points 44 and 51 (as shown in Fig. 3), so as to eliminate the possibility of unclamping due to heavy vibration of the tool bit 15 during a machining operation.

It it is desired to adjust the tool holder to clamp tool bit 15 having different shank sizes, this may be accomplished by rotation of the nut 51 on the threaded extention of the clevis 50. If the nut 51 were to be moved away from the pin 48, the axis of the toggle joint will lengthen thereby increasing the extent to which the bar 33 of the clamps will be moved downward about the pin 39; thus permitting tight clamping of a smaller tool bit. If the "slide" axis is shortened by moving the nut 51 closer to the pin 48, larger size tool bits may be tightly clamped. Adjustment of the position of the nut 51 is best made when the toggle joint is at a position about midway between that shown in Figs. 3 and 4.

Referring to Figs. 6 and 7, a machine tool 62 having a specially adapted shank 64 may be clamped in the tool holder. Due to an increase in overall length of the tool, it has been found desirable to provide the shank 64 with an extension 65 which will fit into the area 26 of the insert notch 16, beneath the positioning stop 24. Further, the shank is provided with a flange 66 which extends upwardly past the tool insert notch 16 to gain additional rigidity. The beveled portion 68 of the tool holder is the equivalent of surface 27 of the tool bit 15 and is engaged by the bar 33 of the clamp 30 when closed.

While a preferred embodiment of my improved tool holder 10 has been shown and described it will be apparent that changes and modifications could be made therein within the scope of the subjoined claims.

What is claimed is:

1. A cutting tool holder having a shank with a longitudinally extending head thereon, said head having a tool positioning notch opening both endwise and outwardly of one side of the head and defined by a side and bottom wall at exact right angles to each other, the opposite side of said head having a transverse recess opening both upwardly and outwardly thereof and defined by opposed sidewalls and by a bottom wall, a substantially T-shaped member pivotally fastened between the sidewalls of said transverse recess, said member having a cross-bar portion extending outwardly above said insert notch and a stem portion extending outwardly on the opposite side, a toggle link pivotally fastened at one end to the extending stem portion, and a toggle slide means, said slide means including a member pivotally fastened to the other end of said toggle link, said member having adjustably attached thereto a rounded member pivotable on the bottom wall of said recess, said toggle link and slide means being operable so as to move upwardly the stem portion of said T-shaped member and to cause the cross-bar portion of said member to engage and clamp the shank of a cutting tool positioned within said insert notch.

2. A cutting tool holder having a shank with a longitudinally extending head thereon, said head having a tool positioning notch opening both endwise and outwardly of one side of the head and defined by a side and bottom wall at exact right angles to each other, the opposite side of said head having a transverse recess opening both upwardly and outwardly thereof and defined by opposed sidewalls and by a bottom wall, a substantially T-shaped member pivotally fastened between the sidewalls of said transverse recess, said member having a cross-bar portion extending outwardly above said insert notch and a stem portion extending outwardly on the opposite side, said cross-bar portion having an inwardly facing slightly convex beveled surface, a toggle link pivotally fastened at one end to the extending stem portion, and a toggle slide means, said slide means including a member pivotally fastened to the other end of said toggle link, said member having adjustably attached thereto a rounded member pivotable on the bottom wall of said recess, said toggle link and slide means being operable so as to move upwardly the stem portion of said T-shaped member and to cause the beveled surface of said cross-bar portion of said member to engage and clamp the shank of a cutting tool positioned within said insert notch.

3. A cutting tool holder having a shank with a longitudinally extending head thereon, a tool positioning notch open at one end extending longitudinally of said shank along one side of said head, said notch being defined by a side and bottom wall, and a stop surface at its closed end perpendicular to said walls, the opposite side of said head having a recess open at one end extending transversely of said shank, said recess being defined by opposed side walls and a bottom wall, a clamping means pivotally mounted within said recess and having a bar extending longitudinally above said notch, and a toggle linkage closely fitting between the opposed side walls of said recess below said clamping means having an adjustable slide axis in contact with the bottom wall of the recess and actuating said clamping means.

References Cited in the file of this patent

UNITED STATES PATENTS

| 21,775 | Palmer | Oct. 12, 1858 |
| 971,556 | Petersen | Oct. 4, 1910 |
| 1,475,278 | Cole | Nov. 27, 1923 |
| 2,408,586 | Spievak | Oct. 1, 1946 |
| 2,577,029 | Moorehead | Dec. 4, 1951 |
| 2,591,692 | Fricke | Apr. 8, 1952 |
| 2,674,029 | Johnson | Apr. 6, 1954 |
| 2,706,327 | Bodin | Apr. 19, 1955 |
| 2,777,347 | Sendoykas | Jan. 15, 1957 |

FOREIGN PATENTS

| 499,697 | Germany | June 11, 1930 |